US008024328B2

(12) United States Patent
Dolin et al.

(10) Patent No.: US 8,024,328 B2
(45) Date of Patent: Sep. 20, 2011

(54) SEARCHING WITH METADATA COMPRISING DEGREE OF SEPARATION, CHAT ROOM PARTICIPATION, AND GEOGRAPHY

(75) Inventors: Robert M. Dolin, Seattle, WA (US); Nikhil Singhal, Redmond, WA (US); Michael I. Torres, Seattle, WA (US); Eytan Seidman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 11/640,704

(22) Filed: Dec. 18, 2006

(65) Prior Publication Data

US 2008/0147722 A1    Jun. 19, 2008

(51) Int. Cl.
*G06F 17/00* (2006.01)
(52) U.S. Cl. ............... 707/723; 707/706; 707/E17.084; 707/E17.109
(58) Field of Classification Search ............ 707/1–103, 707/103 R, 999.003, E17.084, E17.109, 706, 707/758, 723
See application file for complete search history.

(56) References Cited

U.S. PATENT DOCUMENTS

| | | | |
|---|---|---|---|
| 5,388,196 A | 2/1995 | Pajak et al. | |
| 2005/0131866 A1* | 6/2005 | Badros et al. | 707/3 |
| 2005/0171955 A1* | 8/2005 | Hull et al. | 707/10 |
| 2005/0182645 A1 | 8/2005 | Ehlis et al. | |
| 2005/0216300 A1 | 9/2005 | Appelman et al. | |
| 2005/0256866 A1* | 11/2005 | Lu et al. | 707/5 |
| 2005/0267940 A1* | 12/2005 | Galbreath et al. | 709/206 |
| 2005/0283497 A1 | 12/2005 | Nurminen et al. | |
| 2006/0021009 A1 | 1/2006 | Lunt | |
| 2006/0080432 A1 | 4/2006 | Spataro et al. | |
| 2006/0122974 A1 | 6/2006 | Perisic | |
| 2006/0173838 A1 | 8/2006 | Garg et al. | |
| 2006/0218153 A1 | 9/2006 | Voon et al. | |
| 2006/0294085 A1* | 12/2006 | Rose et al. | 707/3 |

FOREIGN PATENT DOCUMENTS

WO    WO2006062532 A2    6/2006

OTHER PUBLICATIONS

Lagoze, et al., "The Warwick Framework A Container Architecture for Aggregating Sets of Metadata", Date: Jun. 28, 1996, http://www.ifla.org.sg/documents/libraries/cataloging/metadata/tr961593.pdf.
Mika, et al., "Descriptions of Social Relations", Date: 2002, http://www.w3.org/2001/sw/Europe/events/foaf-galway/papers/fp/descriptions_of_social_relations/.

* cited by examiner

*Primary Examiner* — Tim T. Vo
*Assistant Examiner* — Shiow-Jy Fan

(57) ABSTRACT

Searches can be performed by attaching social contact metadata to a query where the metadata may be related to a degree of separation, chat room participation and geographical information related to an owner's contacts. Searches can then be executed by generalized search engines based at least in part on the metadata. The metadata may include contact identifiers that are unique across one or more social networks, and may include contacts for individual people as well as groups or other affiliations.

20 Claims, 3 Drawing Sheets

SOCIAL NETWORK WITH FRIEND METADATA

SEARCHING WITH METADATA COMPRISING DEGREE OF SEPARATION, CHAT ROOM PARTICIPATION, AND GEOGRAPHY

BACKGROUND

Social networks in the online world are typically based on relationships between people or affiliations such as groups, educational institutions, workplaces, etc. Some of the people may form relationships offline and establish an online relationship. An example may be a family member establishing an online relationship with another family member. Other people may form relationships online and then establish an offline relationship, such as an internet dating service. Still other relationships may be established online and remain online.

Social networks provide a rich area for content, where friends may post blog entries, share recipes or pictures, or various other data. When a user wishes to search within the social network, the search technologies can be cumbersome, computationally intensive, and may not return the desired results. Additionally, such searches may be limited to a specific social network and may not be accessible to generalized search engines.

SUMMARY

Searches can be performed within a social network by attaching social contact metadata to data. A webpage or other indexed data may have metadata that includes an owner's first degree contacts. Searches can then be executed within the first degree contacts to return data within a social network, and the searches may be performed by generalized search engines. The metadata may include contact identifiers that are unique across one or more social networks, and may include contacts for individual people as well as groups or other affiliations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
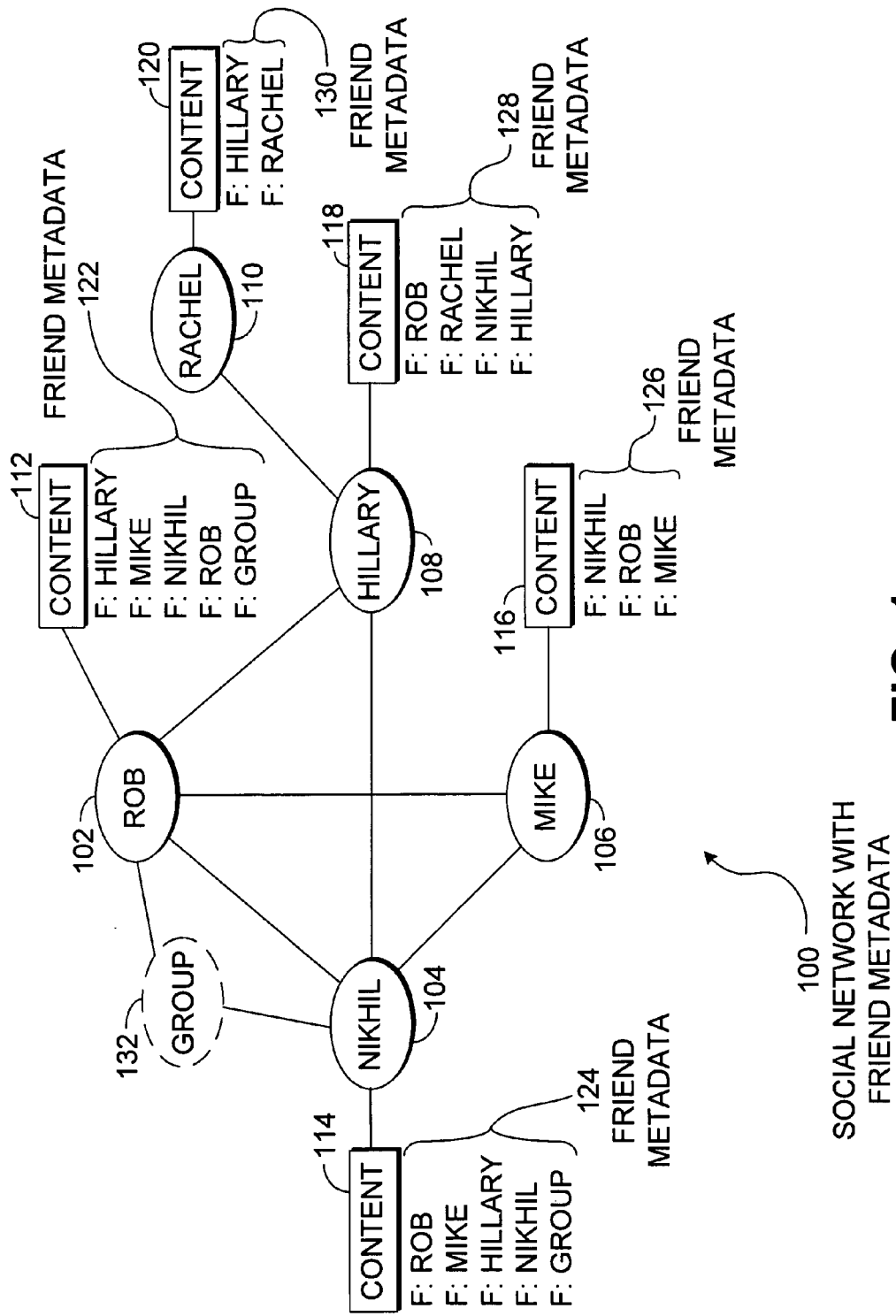
FIG. 1 is a diagrammatic illustration of an embodiment showing a social network with friend metadata.

Metadata may be attached to content that identifies first degree relationships between a content owner and other content owners. By searching on the relationship metadata, meaningful and useful content can be retrieved from a user's circle of friends and relationships. Metadata may be created through a social network, where a person's personal webpage, blog, or other content is presented along with metadata that identifies the person's circle of friends. In some embodiments, a content providing system may be linked to one or more social network databases to generate friend metadata.

Every user may have a unique identifier that is used throughout the network or even spanning the Internet so that generalized search engines may correlate friend metadata across one or more content domains. In some instances, group membership may be used to generate friend metadata, as well as first degree, second degree, and further contact relationships.

As content is served, metadata for each of an owner's friends may be attached. The metadata may take the form of a friend tag with the friend's unique identifier for each of a content owner's friends.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a social network with friend metadata. User Rob 102 has established relationships with Nikhil 104, Mike 106, and Hillary 108. Nikhil 104 has relationships with Rob 102, Mike 106, and Hillary 108. Mike 106 has relationships with Rob 102 and Nikhil 104. Hillary 108 has relationships with Rob 102, Nikhil 104, and Rachel 110. Rachel 110 has only one relationship with Hillary 108. Each user Rob 102, Nikhil 104, Mike 106, Hillary 108, and Rachel 110 has associated content 112, 114, 116, 118, and 120, respectively as well as friend metadata 122, 124, 126, 128, and 130, respectively.

The metadata associated with each user's content contains the user identification for the user as well as the user's friends. For example, metadata 124 includes tags to Rob 102, Mike 106, Hillary 108, the content owner Nikhil 104, as well as the group 132. When the metadata are used in a search query, results from a person's group of friends may be returned. By using metadata, common general-purpose search engines may be used to search the data.

A social network may be any type of relationship between users. A common type of social network is a service that facilitates building such relationships and provides avenues for sharing content. Examples of such formal social networks include MySpace, Facebook, LinkedIn, Friendster, Windows Live Spaces, and other systems. Such systems may provide content hosting as well as helping users establish relationships between other users.

In some embodiments, the content associated with a user may be provided on one system or server and metadata generated for the content from relationships stored in another system or server. For example, the content 112 associated with Rob 102 may be a personal website or blog hosted by an internet service provider. The metadata 122 may be generated through a connection or affiliation to a social network system, such as LinkedIn, that contains the relationships between Rob 102, Nikhil 104, Mike 106, and Hillary 108. When the content is requested, a link to a social network may provide metadata for the content.

Some relationships may be formed as a mutual, two-way relationship. In such a relationship, both parties may share content, status, or other information in a peer-to-peer context. Other relationships may be a one-way relationship where one party shares information to a second party, but the second party does not extend the same rights to the first. An example of a one-way relationship may be between a company and an employee. The employee may grant full access of the company into the employee's content within the scope of employment, but the employee does not have the same right of the employer. Another example may be a social network that allows a first person to link to a second person without having the second person approve or reciprocate.

Metadata 122 may include affiliations with a group 132. The group 132 may include several members, and may be an affiliation such as an employer, a user group, geographical location, or other type of group affiliation. The group 132 may be included in the metadata 122 in different ways. For example, one method for including the group 132 in metadata 122 may be to include a unique identifier for the group itself. In such an example, a search could be performed on the unique group name and return relevant results that would include every member of the group. In another method, the unique identifier for each member of the group 132 may be included as a friend within the metadata 122. In such an example, a search that included a unique identifier for a specific member of the group would return the relevant results without having to provide the unique identifier for the specific group.

In a Hyper Text Markup Language (HTML) content delivery system, the metadata may be provided as META tags within the body, header, or other area of the content. Other formats for content delivery may provide metadata in a manner consistent with the format.

The metadata 122, 124, 126, 128, and 130 contains first degree relationships between the various users. For example, Mike's metadata 126 contains his first degree relationships or Nikhil and Rob. A second degree relationship for Mike 106 would be Hillary 108, since they share common friends of either Nikhil 104 or Rob 102. Rachel 110 is a third degree relationship to Mike 106, since Rachel 110 and Mike 106 are joined by two intermediate relationships. Various implementations may contain one, two, three, or more degrees of separation. In some instances, a second degree relationship may be presented as metadata having different tags than first degree relationships. In other instances, the unique identifier for second degree relationships may be presented as friends without differentiating between first and second degree relationships.

Other types of social networks may be formed through contact lists, distribution lists, membership in a club or group, or other relationships. For example, an implied social network may be created through a user's contacts in a personal data organizer, by the user's participation in chat rooms or online discussion groups, though membership in an organization or club, or through any other mechanism whereby the user's unique identification may be associated with other user's unique identifiers.

In some implementations, a group membership or relationship may be added as metadata by the express actions of a user. For example, a user may select specific friends or group memberships that are applied to specific content. In another implementation, the relationships may be created by taking relationship data from various sources, such as a list of contacts from an address book, and create friend metadata without the express actions of the user.

Figure 2:
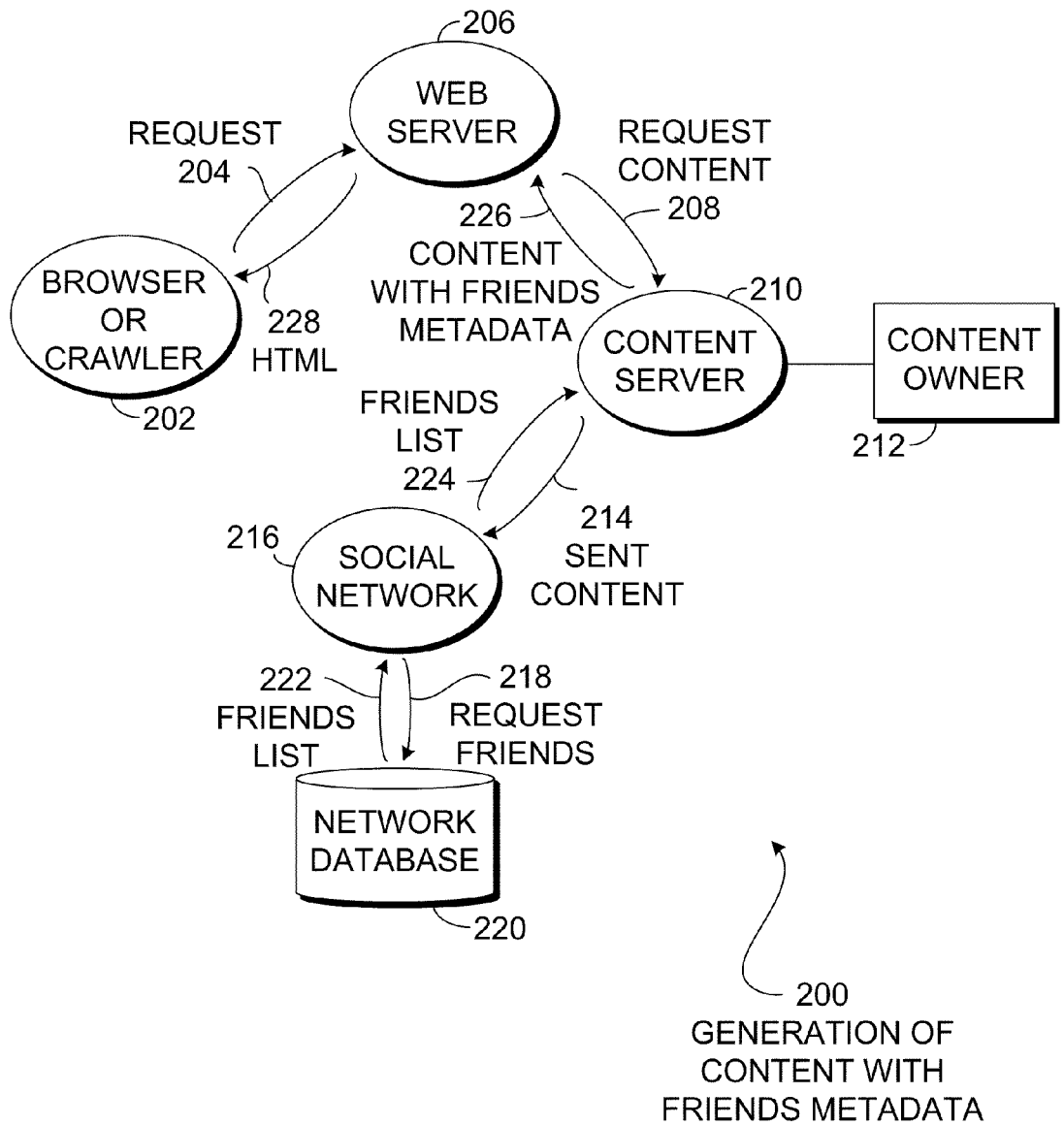
FIG. 2 is a diagrammatic illustration of an embodiment showing the generation of content with friend metadata.

FIG. 2 is an illustration of an embodiment 200 showing a method of generating content with friends metadata. A browser or crawler 202 may send a request 204 to a web server 206. The web server 206 may request some content 208 from a content server 210. The content may have a content owner 212, which is sent 214 to a social network server 216. Using the content owner 212, a request for friends 218 is queried against the social network database 220 to return a friends list 222. The social network server 216 may send the friends list 224 to the content server 210, which in turn may send the content and friends metadata 226 to the web server 206. The web server 206 may format the content and present the content in HTML 228 to the browser or crawler 202.

The embodiment 200 illustrates how content may be associated with a friends list from a social network. When a request of a web server 206 is made, queries to various other servers may be made to gather content for a web page. When a unique identifier of a content owner is found, a query to a social network server 216 may be used to generate metadata that includes friends of the content owner. In some cases, the web server 206, content server 210, and social network server 216 may be one system, but in other cases, one or more separate systems may be used for each function.

The web server 206 may be a front end system that hosts a website. When a page is requested from the web server 206, a content server 210 may be called to deliver various data that comprises a webpage. For example, a weblog or a personal website may be stored in a database that is hosted on a different computer than the web server. In some cases, content for a single web page may come from several different sources located on several different servers.

Once a content owner is identified, friends of the content owner may be determined by consulting the social network server 216. In some cases, the content server 210 and social network server 216 may be tightly related where the social network and content are part of a unified experience for a user. In other case, the content server 210 and social network server 216 may be independent systems.

For example, a personal website may include a query to a social network server to generate friends metadata for the content, even though the content is not related in any specific fashion to the social network. The social network server 216 may be an internet message network that contains friends of the content owner, a registry of personal contact information and addresses for a content owner's friends and family, or any other system that can provide unique identifiers for parties to a content owner's relationships. In some instances, the relationships may be between real persons, but relationships may also exist between real persons and companies, groups, or other affiliations, or between companies or groups, for example.

Figure 3:
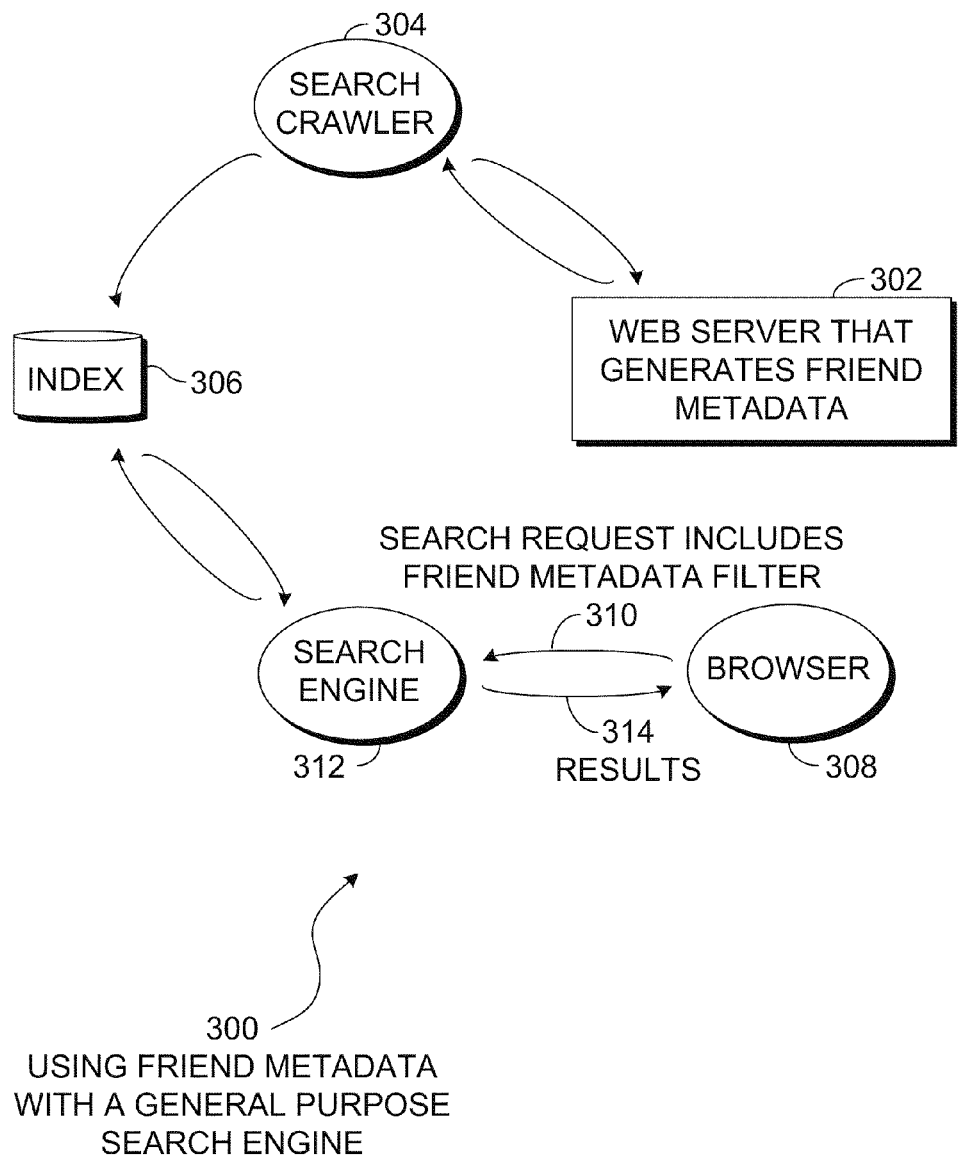
FIG. 3 is a diagrammatic illustration of an embodiment showing the use of friend metadata with a general purpose search engine.

FIG. 3 is an illustration of an embodiment 300 of a search engine use of friend metadata. A web server that generates friend metadata 302 interacts with a search crawler 304. The search crawler 304 generates an index 306. When a browser 308 generates a search request including a friend metadata filter 310 to a search engine 312, the search engine 312 interacts with the index 306 to return search results 314 that are displayed on the browser 308.

Embodiment 300 illustrates how friend metadata may be used by a conventional, general purpose search engine, regardless of the system that created the friend metadata. Searches across a friend network may be performed using a general purpose search engine by searching for a user's unique identifier within the metadata. Because the user's unique identifier is included in all of the user's friend's content, the user can perform the search simply and effectively.

In some instances, a user's unique identifier may be used to rank search based on the relationships between a user and the content providers. For example, a user may search for a specific term and explicitly or implicitly provide his unique user identification to the search engine. The results of the search may be ranked such that the user's friend's content may be highlighted or merely higher ranked in the search results. Presumably, the user may have an interest in results that come from sources with whom he has a preexisting relationship.

By associating content with metadata that includes a content owner's network of friends, the metadata may be used by specialized and general purpose search engines to find relevant and pertinent results for a specific content owner.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method of presenting search results embodied in instructions in a storage medium and executed at least in part utilizing a micro-processor, comprising:
   receiving a query from a user;
   attaching metadata to the query based at least in part on
      a level of participation in a chat room of at least one of the user or one or more entities with which the user has a relationship,
      a degree of separation between the user and at least one entity with which the user has a relationship, where an increased number of nodes and edges between two nodes is indicative of a greater degree of separation, and
      a geography of at least one geographically oriented entity with which the user has a relationship; and
   ranking one or more results of the query based at least in part on the metadata comprising at least one of
      placing a first result higher than a second result, the first result corresponding to a first chat room and the second result corresponding to a second chat room, the user having a first level of participation with the first chat room and a second level of participation with the second chat room, the first level of participation higher than the second level of participation,
      placing a third result higher than a fourth result, the third result corresponding to a first degree of separation between the user and a first entity and the fourth result corresponding to a second degree of separation between the user and a second entity, the first degree of separation being a lesser degree of separation than the second degree of separation, or
      placing a fifth result higher than a sixth result, the fifth result corresponding to a first geographically oriented entity with which the user has a relationship and the sixth result corresponding to a second geographically oriented entity with which the user has a relationship, the user being geographically closer to the first geographically oriented entity than to the second geographically oriented entity.

2. The method of claim 1, the ranking comprising filtering at least some of the results.

3. The method of claim 1, comprising:
   sending the query to a server; and
   executing the query based at least in part on the metadata.

4. The method of claim 1, the metadata comprising at least one tag for respective degrees of separations between the user and the at least one entity.

5. The method of claim 1, the metadata based at least in part on the user's friends, a social network, a blog, a unique identifier, or group membership.

6. The method of claim 1, comprising returning the results as a link to a social network.

7. The method of claim 1, the relationship comprising at least one of a mutual, two way, one way, peer-to-peer, or company-employee relationship.

8. The method of claim 1, the at least one entity comprising at least one of an employer, a company, an educational institution, a geographically oriented group, or another user.

9. The method of claim 1, comprising:
building an index based at least in part on the metadata;
searching the index utilizing a generalized search engine; and
displaying the results in a browser based at least in part on the metadata.

10. A system configured to present search results comprising:
one or more micro-processors;
one or more memory units coupled to at least one of the micro-processors;
a server component configured to accept a query from a user;
a database component comprising metadata indicative of
a level of participation in a chat room of at least one of the user or one or more entities with which the user has a relationship,
node cluster data indicative of a degree of separation between the user and at least one entity with which the user has a relationship, where an increased number of nodes and edges between two nodes is indicative of a greater degree of separation, and
a geography of at least one geographically oriented entity with which the user has a relationship; and
a content delivery component configured to generate and rank one or more results for the query based at least in part on the metadata and at least one of
place a first result higher than a second result, the first result corresponding to a first chat room and the second result corresponding to a second chat room, the user having a first level of participation with the first chat room and a second level of participation with the second chat room, the first level of participation higher than the second level of participation,
place a third result higher than a fourth result, the third result corresponding to a first degree of separation between the user and a first entity and the fourth result corresponding to a second degree of separation between the user and a second entity, the first degree of separation being a lesser degree of separation than the second degree of separation, or
place a fifth result higher than a sixth result, the fifth result corresponding to a first geographically oriented entity with which the user has a relationship and the sixth result corresponding to a second geographically oriented entity with which the user has a relationship, the user being geographically closer to the first geographically oriented entity than to the second geographically oriented entity, at least some of at least one of the server, database, or content delivery component implemented at least in part utilizing at least one of the micro-processors.

11. The system of claim 10, the node cluster data based at least in part on an implied social network.

12. The system of claim 10, comprising a network component configured to generate at least some of the metadata based at least in part on the query.

13. The system of claim 10, the user or at least one of the entities comprising unique entity identifiers.

14. The system of claim 10, at least two of the entities comprising groups and the content delivery component configured to rank the results based at least in part on an average degree of separation respective groups have with the user.

15. The system of claim 10, the content delivery component configured to return at least one result in the form of a link to a social network.

16. The system of claim 10, at least one of the relationships comprising at least one of a contact list, a distribution list, a club membership, or a group membership.

17. The system of claim 10, the content delivery component configured to filter at least some of the results.

18. The system of claim 10, the metadata comprising at least one tag for respective degrees of separations between the user and the at least one entity.

19. A tangible computer-readable storage device comprising computer-executable instructions, which when executed via a processor on a computer perform acts, comprising:
receiving a query from a user;
attaching metadata to the query based at least in part on
a level of participation in a chat room of at least one of the user or one or more entities with which the user has a relationship,
a degree of separation between the user and at least one entity with which the user has a relationship, where an increased number of nodes and edges between two nodes is indicative of a greater degree of separation, the degree of separation based at least in part on a type of relationship the user has with the corresponding entity, and
a geography of at least one geographically oriented entity with which the user has a relationship; and
ranking one or more results of the query based at least in part on the metadata comprising at least one of
placing a first result higher than a second result, the first result corresponding to a first chat room and the second result corresponding to a second chat room, the user having a first level of participation with the first chat room and a second level of participation with the second chat room, the first level of participation higher than the second level of participation,
placing a third result higher than a fourth result, the third result corresponding to a first degree of separation between the user and a first entity and the fourth result corresponding to a second degree of separation between the user and a second entity, the first degree of separation being a lesser degree of separation than the second degree of separation, or
placing a fifth result higher than a sixth result, the fifth result corresponding to a first geographically oriented entity with which the user has a relationship and the sixth result corresponding to a second geographically oriented entity with which the user has a relationship, the user being geographically closer to the first geographically oriented entity than to the second geographically oriented entity.

20. The computer-readable storage device of claim 19, at least one of the relationships based at least in part on an implied social network.

* * * * *